United States Patent [19]

Hansen et al.

[11] 4,285,860
[45] Aug. 25, 1981

[54] TRISAZO OR TETRAKISAZO DYES CONTAINING A HETEROCYCLIC GROUP

[75] Inventors: Guenter Hansen, Ludwigshafen; Hans J. Kolbinger, Gruenstadt; Horst Scheuermann, Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 112,635

[22] Filed: Jan. 16, 1980

[30] Foreign Application Priority Data

Jan. 31, 1979 [DE] Fed. Rep. of Germany ....... 2903588

[51] Int. Cl.³ .................... C09B 31/22; C09B 31/30; C09B 33/22; C09B 33/28
[52] U.S. Cl. .................... 260/152; 260/154; 260/156; 260/157; 260/158; 8/437
[58] Field of Search .............. 260/152, 154, 155, 156, 260/157, 158

[56] References Cited

U.S. PATENT DOCUMENTS 4,097,476 6/1978 Wicki .................................. 260/173

FOREIGN PATENT DOCUMENTS

| | | |
|---|---|---|
| 2230756 | 1/1974 | Fed. Rep. of Germany ........... 260/169 |
| 1410856 | 10/1975 | United Kingdom ..................... 260/169 |
| 1440088 | 6/1976 | United Kingdom ..................... 260/169 |
| 1465889 | 3/1977 | United Kingdom ..................... 260/169 |
| 1518125 | 7/1978 | United Kingdom ..................... 260/169 |

*Primary Examiner*—Floyd D. Higel
*Attorney, Agent, or Firm*—Oblon, Fisher, Spivak, McClelland & Maier

[57] ABSTRACT

Polyazo dyes which in the form of the free acids correspond to the general formula I

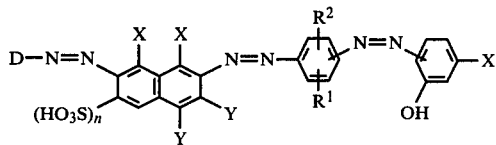

where
D is the radical of a diazo component, or a radical of the formula

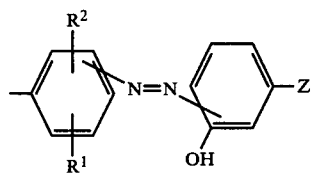

n is 0 or 1,
$R^1$ is hydrogen, chlorine, bromine, methyl, ethyl, methoxy, ethoxy, carboxyl, trifluoromethyl, methylsulfonyl, ethylsulfonyl or hydroxysulfonyl,
$R^2$ is hydrogen, chlorine, bromine, methyl, methoxy, carbamyl or sulfamyl,
one X is hydroxyl and the other X is amino, Y is hydrogen or hydroxysulfonyl, but at least one Y is hydroxysulfonyl and
Z is a radical of the formula

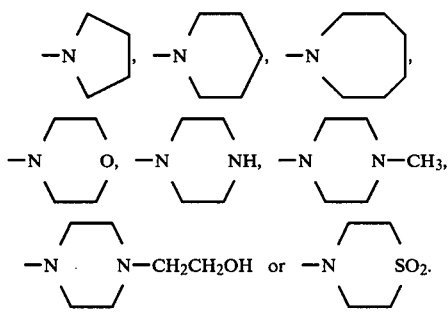

2 Claims, No Drawings

TRISAZO OR TETRAKISAZO DYES CONTAINING A HETEROCYCLIC GROUP

The present invention relates to compounds which in the form of the free acids correspond to the general formula I

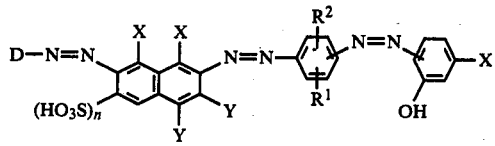

where
D is the radical of a diazo component, or a radical of the formula

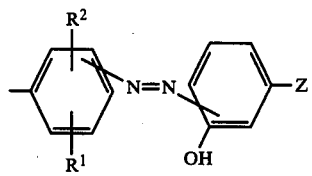

n is 0 or 1,
$R^1$ is hydrogen, chlorine, bromine, methyl, ethyl, methoxy, ethoxy, carboxyl, trifluoromethyl, methylsulfonyl, ethylsulfonyl or hydroxysulfonyl,
$R^2$ is hydrogen, chlorine, bromine, methyl, methoxy, carbamyl or sulfamyl,
one X is hydroxyl and the other X is amino,
Y is hydrogen or hydroxysulfonyl, but at least one Y is hydroxysulfonyl and
Z is a radical of the formula

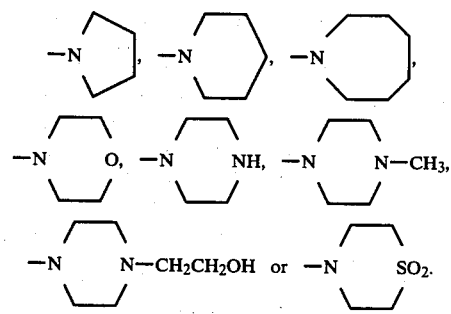

The radicals D are in the main derived from the benzene series, but naphthalene derivatives and heterocyclics, eg. benzthiazoles or thiazoles, are also suitable.

Examples of substituents which may be present in radicals D derived from the benzene series are chlorine, bromine, $C_1$-$C_4$-alkyl, $C_1$-$C_4$-alkoxy, phenoxy, $C_1$-$C_4$-alkylsulfonyl, trifluoromethyl, carboxyl, hydroxysulfonyl, unsubstituted or substituted carbamyl or sulfamyl and unsubstituted or substituted phenylazo.

Examples of unsubstituted and substituted carbamyl, sulfamyl and phenylazo radicals are:

$CONH_2$, $CONHCH_3$, $CONHC_2H_5$, $CONHC_3H_7$, $CONHC_4H_9$, $CONHC_6H_{13}$, $CONHC_8H_{17}$, $CONHCH_2CH$—$C_2H_5$, $CON(CH_3)_2$,
$\quad\quad\quad\quad\quad\quad\quad\quad\quad\quad\quad\quad\quad\quad\quad\quad\quad\quad$ | 
$\quad\quad\quad\quad\quad\quad\quad\quad\quad\quad\quad\quad\quad\quad\quad\quad\quad\quad C_4H_9$
$CON(C_2H_5)_2$, $CON(C_3H_7)_2$, $CON(C_4H_9)_2$, $CONHC_2H_4OH$ and $CON$—$C_2H_5$,
$\quad\quad\quad\quad\quad\quad\quad\quad\quad\quad$ |
$\quad\quad\quad\quad\quad\quad\quad\quad\quad\quad C_2H_4OH$ the corresponding sulfamyl radicals, and

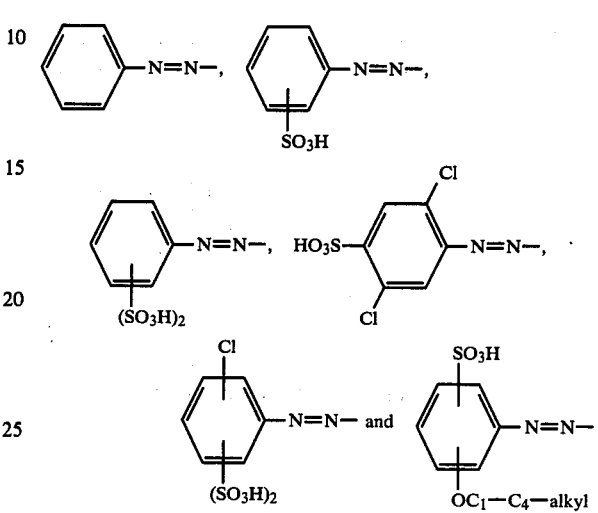

Specific examples of diazo components are aniline, o-, m- and p-chloroaniline, o-, m- and p-bromoaniline, o-, m- and p-nitroaniline, o-, m- and p-toluidine, o-, m- and p-anisidine, 2,5-dichloroaniline, 3,4-dichloroaniline, 2,4-dichloroaniline, 2,6-dichloroaniline, 1-aminobenzene-2-sulfonic acid, 1-aminobenzene-3-sulfonic acid, 1-aminobenzene-4-sulfonic acid, 2,5-dichloro-1-aminobenzene-4-sulfonic acid, 2,6-dibromo-1-aminobenzene-4-sulfonic acid, 1-aminobenzene-2,4-disulfonic acid, 1-aminobenzene-2,5-disulfonic acid, 2-chloro-1-aminobenzene-4-sulfonic acid, 4-nitro-1-aminobenzene-2-sulfonic acid, 2-nitro-1-aminobenzene-4-sulfonic acid, 1-aminobenzene-2-carboxylic acid, 1-aminobenzene-4-carboxylic acid, 5-sulfo-2-amino-benzoic acid, 1-aminonaphthalene-4-sulfonic acid, 1-aminonaphthalene-3,6-disulfonic acid, 1-aminonaphthalene-6/7-sulfonic acid, 2-aminonaphthalene-1-sulfonic acid, 2-aminonaphthalene-8-sulfonic acid, 2-aminonaphthalene-4,8-disulfonic acid,

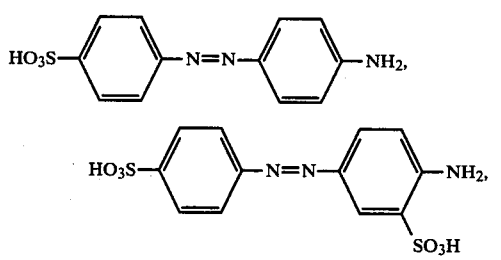

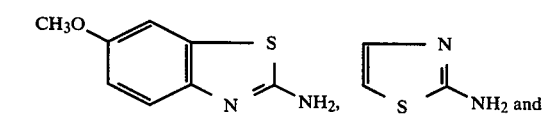

-continued

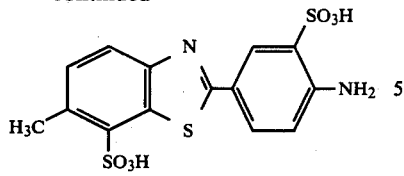

A compound of the formula I may be prepared by reacting a diazo compound of an amine of the formula II

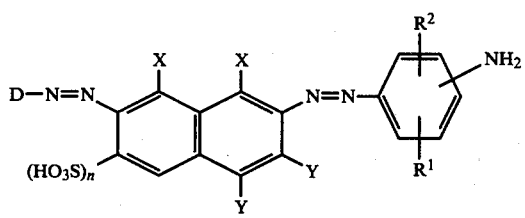

with a coupling component of the formula III

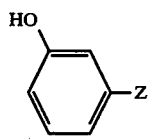

or reacting a tetraazo component of the formula IV

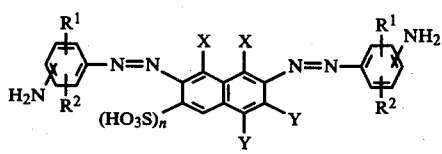

with a coupling component of the formula III.

The preparation of compounds of the formulae II and IV is known in principle or may be carried out by analogy to conventional methods. Details of the preparation of the compounds of the formula I may be found in the Examples, where parts and percentages are by weight, unless stated otherwise.

The compounds of the formula I are particularly suitable for dyeing leather, as well as nylon, cotton and paper. The dyeings obtained are distinguished by good lightfastness and wetfastness.

Compounds of particular importance are those of the formula Ia

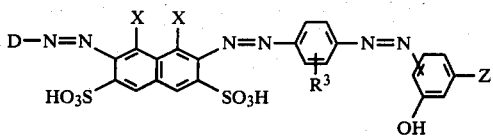

where
R$^3$ is hydrogen, chlorine or hydroxysulfonyl and
D, X and Z have the stated meanings.
A preferred meaning of D is

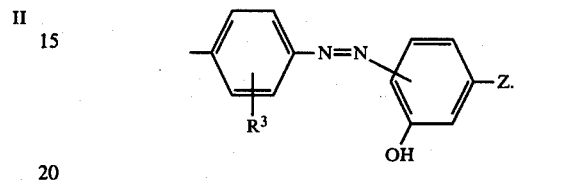

and preferred meanings of Z are morpholinyl, piperidinyl and pyrrolidinyl.

EXAMPLE 1

7 parts of sodium nitrite in 50 parts of water are added to an ice-cold suspension of 13.8 parts of 4-nitroaniline in a mixture of 350 parts of water and 30 parts of concentrated hydrochloric acid. A solution of 36.3 parts of the disodium salt of 1-amino-8-naphthol-3,6-disulfonic acid in 250 parts of water is then added in the course of 30 minutes at room temperature and the mixture is stirred for 6 hours. Thereafter, it is cooled to below 10° C. and an aqueous suspension of the diazonium salt prepared from 17.3 parts of sulfanilic acid is added. Sufficient sodium carbonate is then added to raise the pH of the mixture to 9, and stirring is continued for 2 hours at 10° C. Thereafter the temperature is raised to 45°–50° C., a solution of 12.8 parts of sodium sulfide in 150 parts of water is added and stirring is continued for 30 minutes. The solution is then cooled to 20°–25° C., sufficient sodium chloride is added to give a salt concentration of 20%, and concentrated hydrochloric acid is then introduced in order to acidify the mixture. The aminodisazo dye which precipitates is filtered off and suspended in 1,000 parts of water at room temperature. 30 parts of concentrated hydrochloric acid are added, followed by a solution of 7 parts of sodium nitrite in 50 parts of water. After stirring the mixture for 90 minutes, the excess nitrous acid is destroyed by adding from 1 to 2 parts of sulfamic acid in 20 parts of water, and a solution of 18 parts of m-morpholinophenol in 100 parts of water and 8 parts of sodium hydroxide is then added.

Thereafter, the coupling mixture is brought to a pH of 9–10 with dilute sodium hydroxide solution, and after stirring overnight the product is salted out with sodium chloride, filtered off and dried at 100° C. A black powder of the formula

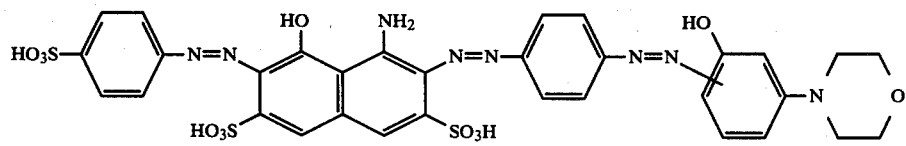

is obtained, which dyes leather in full bluish black hues.
The dyes listed in the Table below were prepared by a method similar to Example 1.

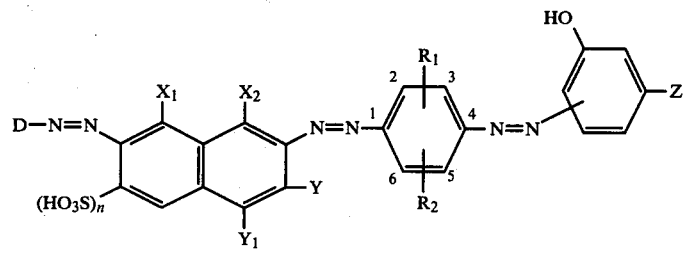

| Example | D—NH$_2$ | n | X$_1$ | X$_2$ | Y$_1$ | Y$_2$ | R$_1$ | R$_2$ | Z | Hue on leather |
|---|---|---|---|---|---|---|---|---|---|---|
| 2 | HO$_3$S—C$_6$H$_4$—NH$_2$ | 1 | OH | NH$_2$ | H | SO$_3$H | 2-Cl | H | —N(morpholine) | bluish black |
| 3 | 2-NH$_2$-5-CH$_3$-benzenesulfonic acid | " | " | " | " | " | H | " | " | " |
| 4 | 2-NH$_2$-4-OCH$_3$-benzenesulfonic acid | " | " | " | SO$_3$H | H | H | H | " | " |
| 5 | HO$_3$S—C$_6$H$_4$—NH$_2$ | " | NH$_2$ | OH | H | SO$_3$H | " | " | —N(piperidine) | " |
| 6 | HO$_3$S—C$_6$H$_4$—NH$_2$ | " | OH | NH$_2$ | " | " | 2-OCH$_3$ | " | " | " |
| 7 | 2-NH$_2$-4-CH$_3$-5-Cl-benzenesulfonic acid | 0 | " | " | SO$_3$H | H | 2-SO$_3$H | " | —N(morpholine) | reddish black |
| 8 | 2-NH$_2$-5-SO$_3$H-benzoic acid | 1 | " | " | H | SO$_3$H | " | " | " | " |
| 9 | 2-NH$_2$-benzoic acid | " | " | " | " | " | H | " | —N(pyrrolidine) | bluish black |
| 10 | 2-NH$_2$-5-SO$_3$H-benzoic acid | " | " | " | " | " | " | " | —N(morpholine) | " |
| 11 | 2-NH$_2$-4-SO$_3$H-dichlorobenzene | " | " | " | SO$_3$H | H | " | " | " | reddish black |
| 12 | HO$_3$S—C$_6$H$_4$—NH$_2$ | " | " | " | H | SO$_3$H | 3-Cl | 6-OCH$_3$ | " | " |
| 13 | " | " | " | " | " | " | 2-OCH$_3$ | 5-OCH$_3$ | —N(piperidine) | bluish black |
| 14 | " | " | NH$_2$ | OH | " | " | 3-COOH | H | —N(morpholine) | " |
| 15 | C$_6$H$_5$—NH$_2$ | 1 | OH | NH$_2$ | H | SO$_3$H | 2-SO$_3$H | H | —N(piperidine) | bluish black |

-continued

| # | Structure | n | | | | | | Amine | Color |
|---|---|---|---|---|---|---|---|---|---|
| 16 | 4-Cl-C6H4-NH2 | " | " | " | " | " | " | -N(morpholine) | " |
| 17 | 4-Cl-C6H4-NH2 | " | NH2 | OH | " | " | " | " | dark blue |
| 18 | 2,4-di-Cl-C6H3-NH2 | " | OH | NH2 | " | " | " | " | reddish black |
| 19 | 2-CH3-C6H4-NH2 | " | " | " | SO3H | H | " | " | bluish black |
| 20 | 2-OCH3-C6H4-NH2 | " | " | " | H | SO3H | " | " | " |
| 21 | 5-HO3S-naphthyl-1-NH2 | " | " | " | " | " | H | " | " |
| 22 | 5,7-di-HO3S-naphthyl-1-NH2 | 1 | OH | NH2 | H | SO3H | H | H | -N(morpholine) | bluish black |
| 23 | 5-HO3S-naphthyl-1-NH2 | " | " | " | " | " | " | -N(pyrrolidine) | " |
| 24 | 1-NH2-2-OH-4-HO3S-naphthalene | " | " | " | " | " | " | -N(piperidine) | dark blue |
| 25 | 2-NH2-1-HO3S-naphthalene | " | " | " | " | " | " | -N(morpholine) | " |
| 26 | 2-NH2-8-HO3S-naphthalene | 1 | OH | NH2 | H | SO3H | H | H | -N(morpholine) | dark blue |
| 27 | 3-NH2-5,8-di-HO3S-naphthalene | 0 | " | " | SO3H | H | " | " | " |
| 28 | HO3S-C6H4-N=N-C6H4-NH2 | 1 | " | " | H | SO3H | 2-SO3H | " | -N(piperidine) | " |
| 29 | HO2S-C6H4-N=N-(3-SO3H-4-NH2-C6H3) | " | " | " | " | " | H | " | " | bluish black |
| 30 | benzothiazole derivative (H3C, SO3H, NH2, SO3H substituents) | 1 | " | " | SO3H | H | " | " | -N(morpholine) | " |

| Example | Formula | Hue on leather |
|---|---|---|
| 31 | | dark blue |
| 32 | | greenish black |
| 33 | | " |
| 34 | | bluish black |

EXAMPLE 35

40 parts of p-nitroaniline are stirred for some hours with 375 parts of water. The mixture is then brought to 0° C. with ice, and 78 parts by volume of hydrochloric acid of 19° Bé strength are added. When the mixture has been stirred thoroughly, 87 parts by volume of sodium nitrite solution (23% by weight) are added, and after completion of diazotiation the excess nitrite is destroyed with amidosulfonic acid. The diazonium salt solution thus obtained is added, at 0°-5° C, to a slurry of 1-amino-8-naphthol-3,6-disulfonic acid and the mixture is kept for about 3 hours at 0°-5° C. (The slurry is prepared as follows: a neutral solution of 41.6 parts of 1-amino-8-naphthol-3,6-disulfonic acid in water is prepared and is then run into a mixture of 225 parts of water, 18 parts by volume of hydrochloric acid of 19° Bé strength and ice, whereupon 1-amino-8-naphthol-3,6-disulfonic acid precipitates in a finely crystalline form. After about 3 hours, an aqueous solution of 45 parts of sodium carbonate is run in over 30 minutes, resulting in a pH of 7.5-8. Temperature: 0°-5° C.).

After about 16 hours at 0°-5° C., an aqueous solution of 40.5 parts of 60% strength sodium sulfide is added, whereupon the temperature rises to 25°-30° C. and the reduced disazo dye dissolves. The reduction is complete in 20 minutes, the mixture is then rendered acid to Congo Red with 165 parts by volume of hydrochloric acid of 19° Bé strength, and the reduced product which has precipitated is filtered off.

The resulting paste of the reduced product is stirred into 500 parts of water at 70° C. and dissolved by adding 30 parts of sodium carbonate. 36 parts of active charcoal and 1.2 parts of iron sulfate are then added. After stirring for one hour, the solution is filtered.

67 parts by volume of sodium nitrite solution (23% by weight) are added to the filtrate, and the mixture is brought to 25°-30° C. with ice and is added to a mixture of 75 parts of water, 85 parts by volume of hydrochloric acid of 19° Bé strength and ice (this mixture being at 0°-5° C.). After stirring the batch for 4 hours, the pH is brought to 2.5 with 90 parts by volume of 10% strength sodium carbonate solution.

The tetrazotization solution is then run into a solution of 48.3 parts of 3-morpholino-phenol, 540 parts of water and 27 parts by volume of sodium hydroxide solution of 40° Bé strength. The coupling temperature is kept at 0°-5° C. by adding ice; the pH of the reaction mixture is brought to 10 with dilute sodium hydroxide solution. After stirring the mixture overnight, coupling is complete. The dye solution is heated to about 60° C., sodium chloride is added and the product is filtered off after 2 hours. After drying at 60° C. under reduced pressure, the compound of the formula

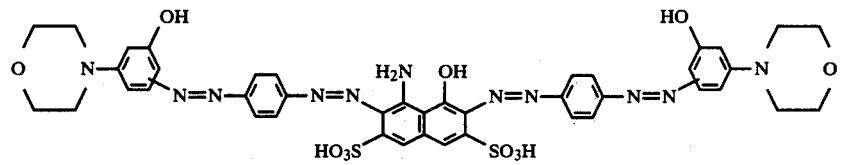

is obtained as a dark powder, which dyes leather in bluish black hues having good fastness characteristics.

The Table which follows lists dyes which can be prepared, by methods similar to Example 35, from the components shown, and which produce similar hues on leather.

| Example | $R_1$ | $R_2$ | n | $Y_1$ | $Y_2$ | $R_3$ | $R_4$ | Z |
|---|---|---|---|---|---|---|---|---|
| 36 | H | H | 1 | H | $SO_3H$ | 2-$SO_3H$ | H | −N(morpholino) |
| 37 | " | " | " | " | " | H | " | −N(piperidino) |
| 38 | 3-$SO_3H$ | " | " | " | " | 2-$SO_3H$ | " | −N(pyrrolidino) |
| 39 | H | H | " | $SO_3H$ | H | H | " | −N(morpholino) |
| 40 | 3-Cl | " | " | H | $SO_3H$ | 2-$SO_3H$ | " | " |
| 41 | 3-$SO_3H$ | " | " | " | " | 2-$OCH_3$ | " | " |
| 42 | " | " | " | " | " | 2-$CH_3$ | " | −N(piperidino) |
| 43 | H | " | " | " | " | 2-COOH | " | −N(morpholino) |
| 44 | 3-$OCH_3$ | 6-$SO_3H$ | 0 | $SO_3H$ | H | 2-$SO_3H$ | " | " |

| Example | $R_1$ | $R_2$ | n | $Y_1$ | $Y_2$ | $R_3$ | $R_4$ | Z |
|---|---|---|---|---|---|---|---|---|
| 45 | 3-$SO_3H$ | H | 1 | H | $SO_3H$ | 2-$SO_3H$ | H | −N(piperazino)NH |
| 46 | " | " | " | " | " | " | " | −N(piperazino)N−$CH_3$ |
| 47 | " | " | " | $SO_3H$ | H | 2-COOH | " | " |

-continued

| | | | | | | | |
|---|---|---|---|---|---|---|---|
| 48 | H | " | " | H | SO₃H | 2-SO₃H | " | 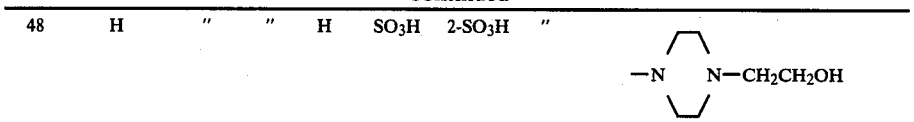 |

| Example | Formula |
|---|---|
| 49 | 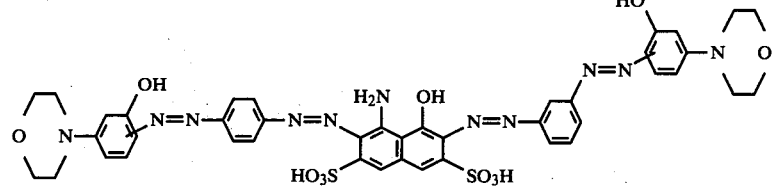 |
| 50 | 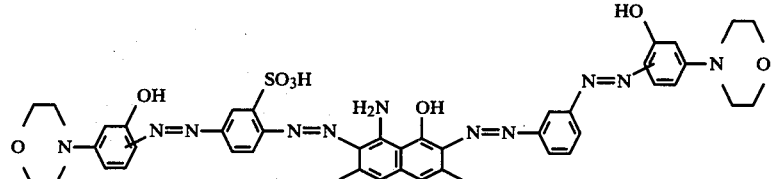 |
| 51 | 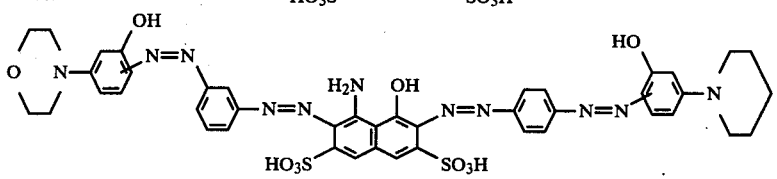 |
| 52 | 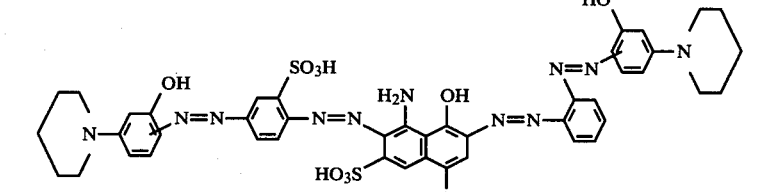 |
| 53 | 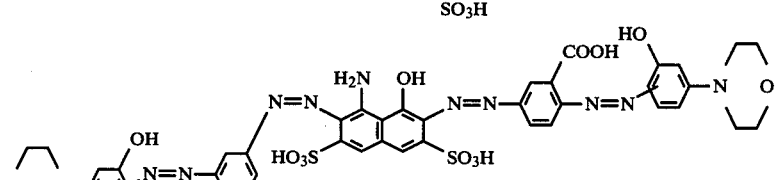 |
| 54 | 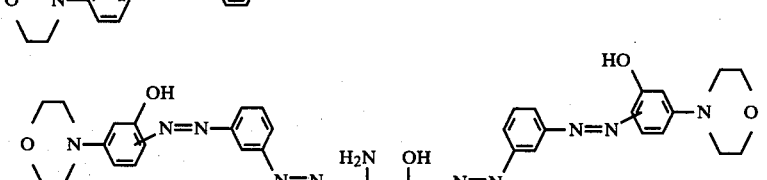 |

We claim:
1. A polyazo dye which in the form of the free acid corresponds to the formula

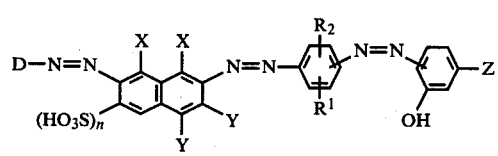

where

D is selected from the group consisting of phenyl; phenyl substituted by chlorine, bromine, $C_1$-$C_4$-alkyl, $C_1$-$C_4$-alkoxy, phenoxy, $C_1$-$C_4$-alkylsulfonyl, trifluoromethyl, carboxyl, hydroxysulfonyl, carbamoyl, sulfamoyl, mono- or di-$C_1$-$C_8$-alkyl substituted carbamoyl or sulfamoyl,

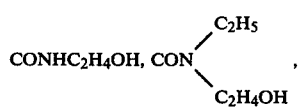

phenylazo, or phenylazo substituted by chlorine, $C_1$-$C_4$-alkoxy or hydroxysulfonyl; naphthyl substituted by hydroxysulfonyl; and

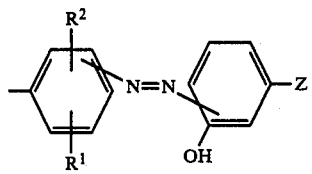

n is 0 or 1, $R^1$ is hydrogen, chlorine, bromine, methyl, ethyl, methoxy, ethoxy, carboxyl, trifluoromethyl, methylsulfonyl, ethylsulfonyl or hydroxysulfonyl, $R^2$ is hydrogen, chlorine, bromine, methyl, methoxy, carbamyl or sulfamyl, one X is hydroxyl and the other X is amino, Y is hydrogen or hydroxysulfonyl, but at least one Y is hydroxysulfonyl and Z is

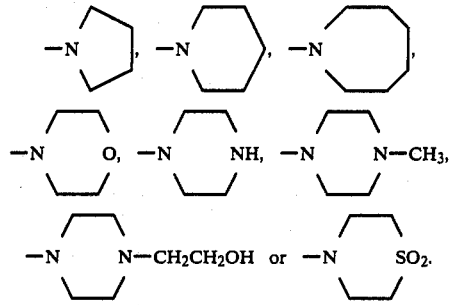

2. A compound as claimed in claim 1, of the formula

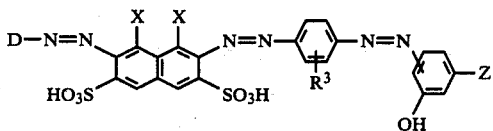

wherein $R^3$ is hydrogen, chlorine or hydroxysulfonyl and D, X and Z have the stated meanings.

* * * * *